(12) United States Patent
Weng (10) Patent No.: US 6,504,484 B1
(45) Date of Patent: Jan. 7, 2003

(54) CONTROL METHOD USING POWER TO PREVENT OVERHEAT INSIDE OF ELECTRIC EQUIPMENT

(75) Inventor: Kuo-Liang Weng, Taichung Hsien (TW)

(73) Assignee: Cohand Technology Co., Ltd., Taichung Hsien (TW)

( * ) Notice: Subject to any disclaimer, the term of this patent is extended or adjusted under 35 U.S.C. 154(b) by 329 days.

(21) Appl. No.: 09/670,024

(22) Filed: Sep. 26, 2000

(51) Int. Cl.[7] .............................................. G08B 17/00
(52) U.S. Cl. ...................... 340/584; 340/588; 340/589; 340/679; 340/635; 340/643
(58) Field of Search ................................ 340/635, 643, 340/584, 588, 589, 679

(56) References Cited

U.S. PATENT DOCUMENTS

| | | | | |
|---|---|---|---|---|
| 5,929,762 A | * | 7/1999 | Missimer, Jr. | 340/584 |
| 6,087,949 A | * | 7/2000 | Yanagida | 340/635 |
| 6,124,793 A | * | 9/2000 | Knutson | 340/584 |
| 6,170,562 B1 | * | 1/2001 | Knoblauch | 165/104.33 |
| 6,172,860 B1 | * | 1/2001 | Yoshimizu et al. | 340/643 |

\* cited by examiner

*Primary Examiner*—Daniel J. Wu
*Assistant Examiner*—Daniel Prévil
(74) *Attorney, Agent, or Firm*—Rosenberg, Klein & Lee (57) ABSTRACT

A control method using power to prevent overheat inside of an electric equipment includes a setting unit, a sensing unit, a central processing unit, an alarm unit, a power cut-off protection unit, and s control unit. The detecting values are supplied by the sensing members of the sensing unit into the central processing unit to be compared with the setting temperature value. The central processing unit then outputs a corresponding control signal to the control unit which controls the loads to perform actions of unload or reload. When the temperature values of the detected members reach the setting temperature values, the central processing unit outputs a control signal to the alarm unit to send an alarm while the power cut-off protection unit cuts off the power of the electric equipment, thereby preventing the detected members from being overheated so as to increase the used lifetime, and thereby assuring the operational functions of the detected members.

3 Claims, 12 Drawing Sheets

CONTROL METHOD USING POWER TO PREVENT OVERHEAT INSIDE OF ELECTRIC EQUIPMENT

BACKGROUND OF THE INVENTION

1. Field of the Invention

The present invention relates to a control method using power to prevent overheat inside of an electric equipment.

2. Description of the Related Art

Figure 1:
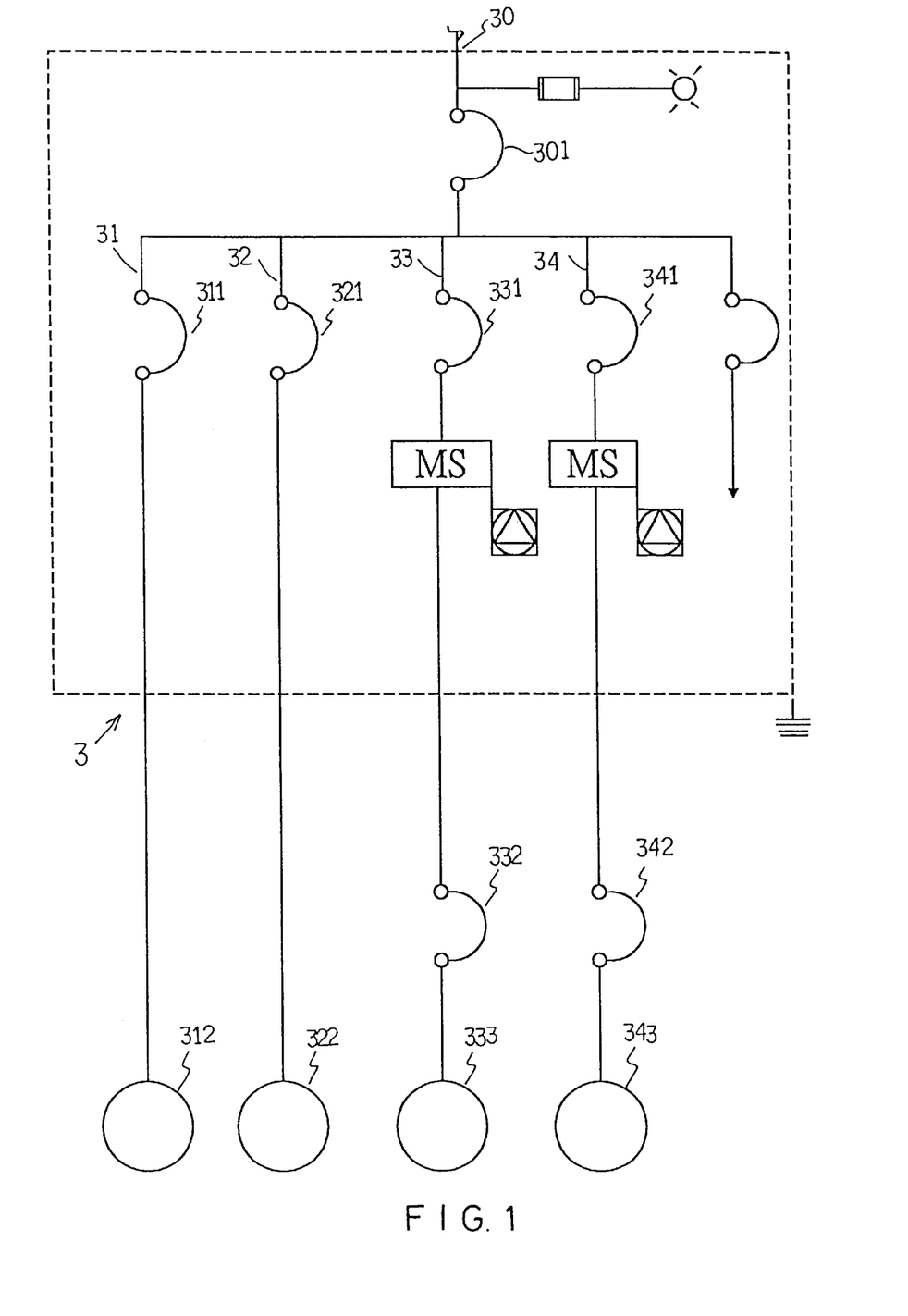
FIG. 1 is a schematic circuit diagram of a conventional electric equipment in accordance with the prior art.

A conventional electric equipment in accordance with the prior art shown in FIG. 1 comprises a circuit 3 including a main circuit 30 having a main switch 301 and including branch circuits 31, 32, 33, 34 . . . each having a branch switch 311, 321, 331, 341, 332, 342 . . . and each corresponding to a load 312, 322, 333, 343 . . . However, in the electric equipment, not only the loads 312, 322, 333, 343 . . . will incur the phenomenon of overheat or fading, but the branch switches 311, 321, 331, 341, 332, 342 . . . or the like will also incur the phenomenon of overheat or fading.

SUMMARY OF THE INVENTION

In accordance with one aspect of the present invention, there is provided a control method using power to prevent overheat inside of an electric equipment comprising the steps of:

(1) when a detecting value (TA) is greater than a first temperature setting value (TS1) plus a setting difference value (X), namely, TA>TS1+X, the load is unloaded to a first grade of power (P1);

(2) when the detecting value (TA) minus a second temperature setting value (TS2) is equal to a second temperature setting difference value ($\Delta T2$), and the second temperature setting difference value ($\Delta T2$) is greater than a first temperature setting difference value ($\Delta T1$) plus the setting difference value (X), namely, TA−TS2=$\Delta T2$, and $\Delta T2$>$\Delta T1$+X, then the load is continuously unloaded to a second grade of power (P2), then, when the detecting value (TA) sequentially minus each grade of temperature setting value (TS3 . . . TS$_n$) is equal to each grade of temperature setting difference value ($\Delta T3$ . . . $\Delta T_{n-1}$,$\Delta T_n$), and each grade of the temperature setting difference value ($\Delta T3$ . . . $\Delta T_{n-1}$, $\Delta T_n$) is greater than a former grade of temperature setting difference value ($\Delta T4$ . . . $\Delta T_{n-2}$, $\Delta T_{n-1}$) plus the grade of setting difference value (X), namely, TA−TS$_n$= $\Delta T_n$, and $\Delta T_n$>$\Delta T_{n-1}$+X, then the load is successively unloaded to a minimum power (P$_{min}$);

(3) when the detecting value (TA) minus a first reload temperature setting value (TS'1) is equal to a first reload temperature setting difference value ($\Delta T'1$), and the first reload temperature setting difference value ($\Delta T'1$) is smaller than a temperature setting difference value ($\Delta T'$) minus the setting difference value (X), namely, TA−TS'1=$\Delta T'1$, and $\Delta T'1$<$\Delta T'$−X, then the load is continuously reloaded to a first grade of power (P1), then, when the detecting value (TA) sequentially minus each grade of reload temperature setting value (TS'2 . . . TS'$_n$) is equal to each grade of reload temperature setting difference value ($\Delta T'2$ . . . $\Delta T'_{-1}$, $\Delta T'_n$), and each grade of reload temperature setting difference value ($\Delta T'2$ . . . 'T$_{n-1}$, $\Delta T'_n$) is smaller than a former grade of reload temperature setting difference value ($\Delta T'1$ . . . $\Delta T'_{n-2}$, $\Delta T'_{n-1}$) minus the grade of setting difference value (X), namely, TA−TS'$_n$=$\Delta T'_n$, and $\Delta T'_n$>$\Delta T'_{n-1}$+X, then the load is successively reloaded to a maximum power (P$_{max}$).

Further benefits and advantages of the present invention will become apparent after a careful reading of the detailed description with appropriate reference to the accompanying drawings.

DETAILED DESCRIPTION OF THE INVENTION

Figure 2:
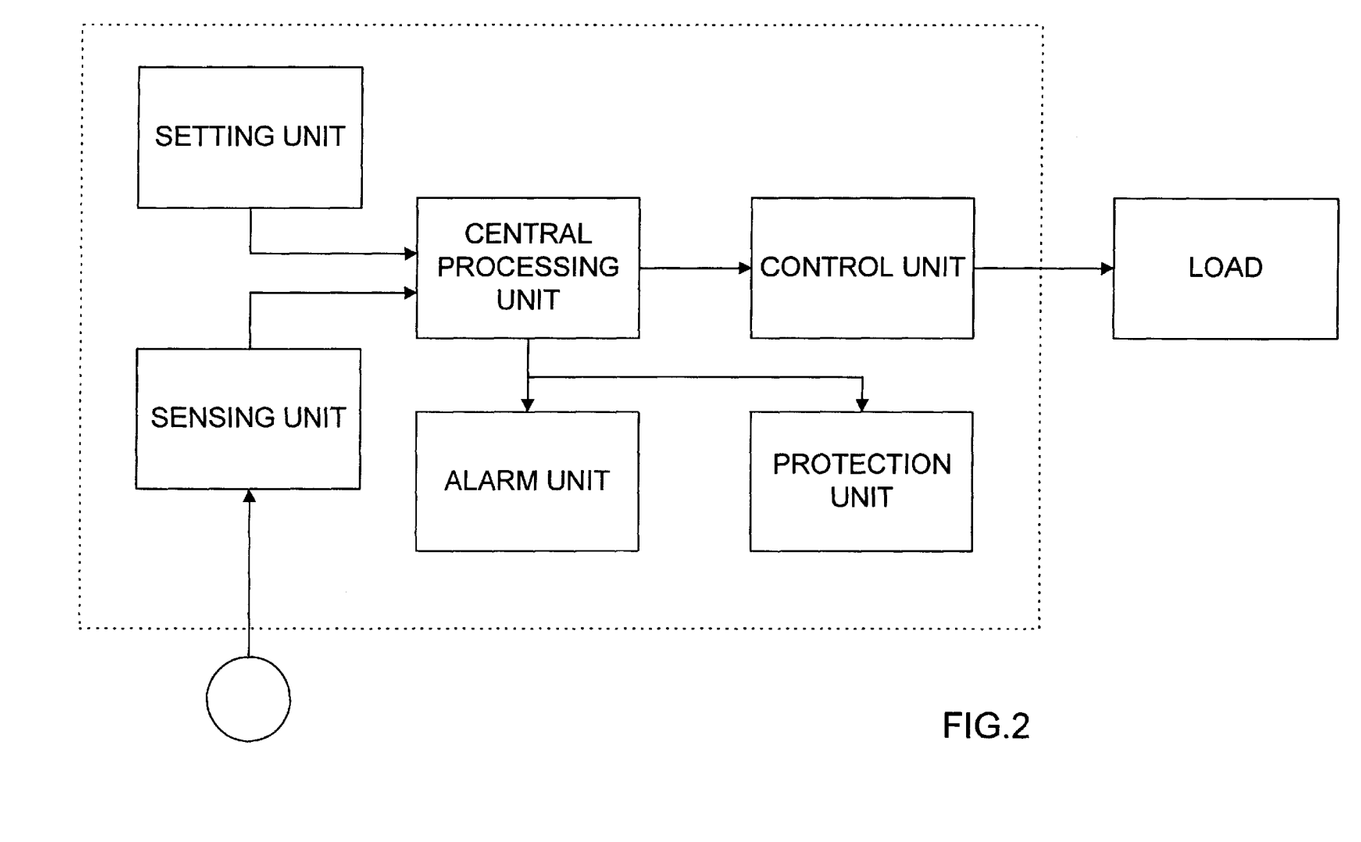
FIG. 2 is a block diagram of a protection device in accordance with the present invention.

Referring to the drawings and initially to FIG. 2, a device in accordance with the present invention comprises a setting unit 11, a sensing unit 12, a central processing unit 17, an alarm unit 14, a power cut-off protection unit 15, and s control unit 16.

The setting unit 11 contains input setting values, and selective operation modes.

The sensing unit 12 includes sensing members 121, 122, 123 . . . which are used to detect the temperature of each detected points G, G1, G2 . . . G$_N$, the detected members can be the switches, joints, electric wires, loads and the like.

The central processing unit 17 contains control programs which serve as the commander basis of the control method of the present invention. The central processing unit 17 is used to compare the detecting value (TA) input by the sensing unit 12 with the setting temperature value (TS) set by the setting unit 11. Then, the control method determined by the control programs outputs a corresponding control signal to the control unit 16, the alarm unit 14 and the power cut-off protection unit 15.

In operation, the detecting values (TA) are supplied by the sensing members 121, 122, 123 . . . of the sensing unit 12 into the central processing unit 17 to be compared with the setting temperature value (TS). The central processing unit 17 then outputs a corresponding control signal to the control unit 16 which controls the load 412, 422, 433 . . . to perform actions of unload or reload. When the temperature values of the detected members reach the setting temperature values, the central processing unit 17 outputs a control signal to the alarm unit 14 to send an alarm while the power cut-off protection unit 15 cuts off the power of the electric equipment, thereby preventing the detected members from being overheated so as to increase the used lifetime, and thereby assuring the operational functions of the detected members.

Figure 4:
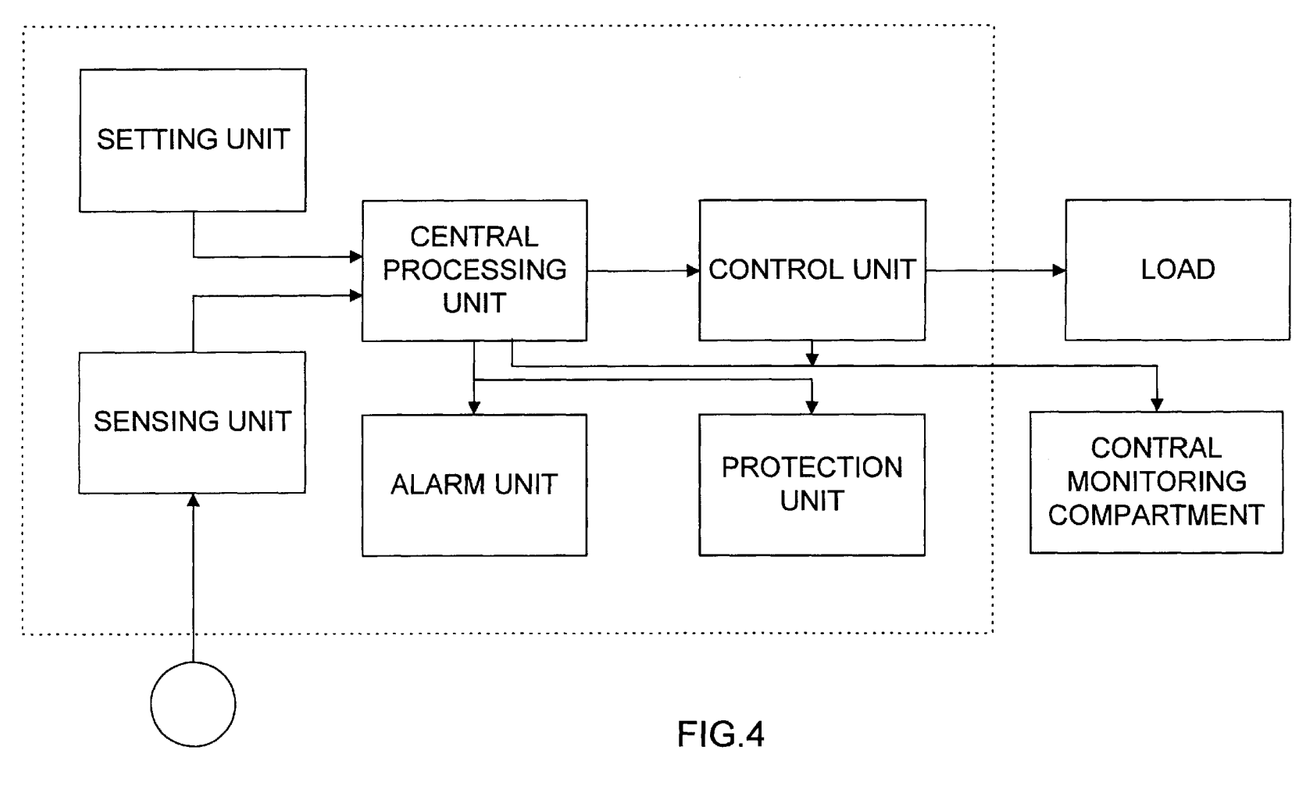
FIG. 4 is a block diagram of a protection device in accordance with another embodiment of the present invention.

As shown in FIG. 4, the device of the present invention is connected to a central monitoring compartment 5.

The sensing members 121, 122, 123 . . . of the sensing unit 12 are mounted on proper positions of each detected points G, G1, G2 . . . $G_N$. The detecting procedures of the sensing members 121, 122, 123 . . . include three basic modes.

Figure 8:
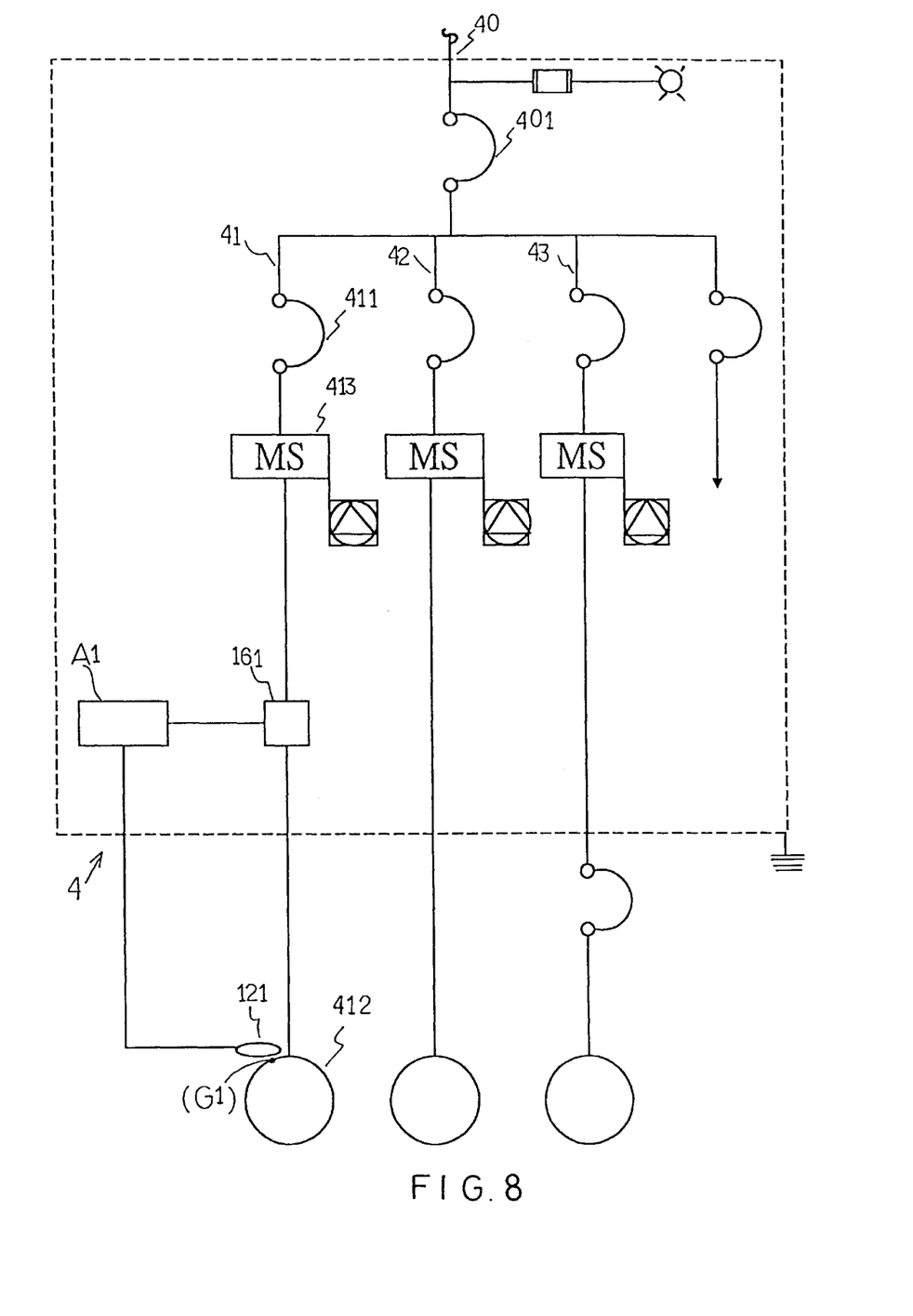
FIG. 8 is a circuit diagram of an electric equipment in accordance with the present invention.

As shown in FIG. 8, the sensing unit can be used for detecting a single member. The electric equipment 4 includes a main circuit 40 which includes branch circuits 41, 42, 43 . . . The load 412 is selected as the detected point G1, wherein the sensing member 121 of the device A1 of the present invention is used to detect the temperature of the detected point G1. When the detected point G1 is overheated, the load 412 will be unloaded.

Figure 9:
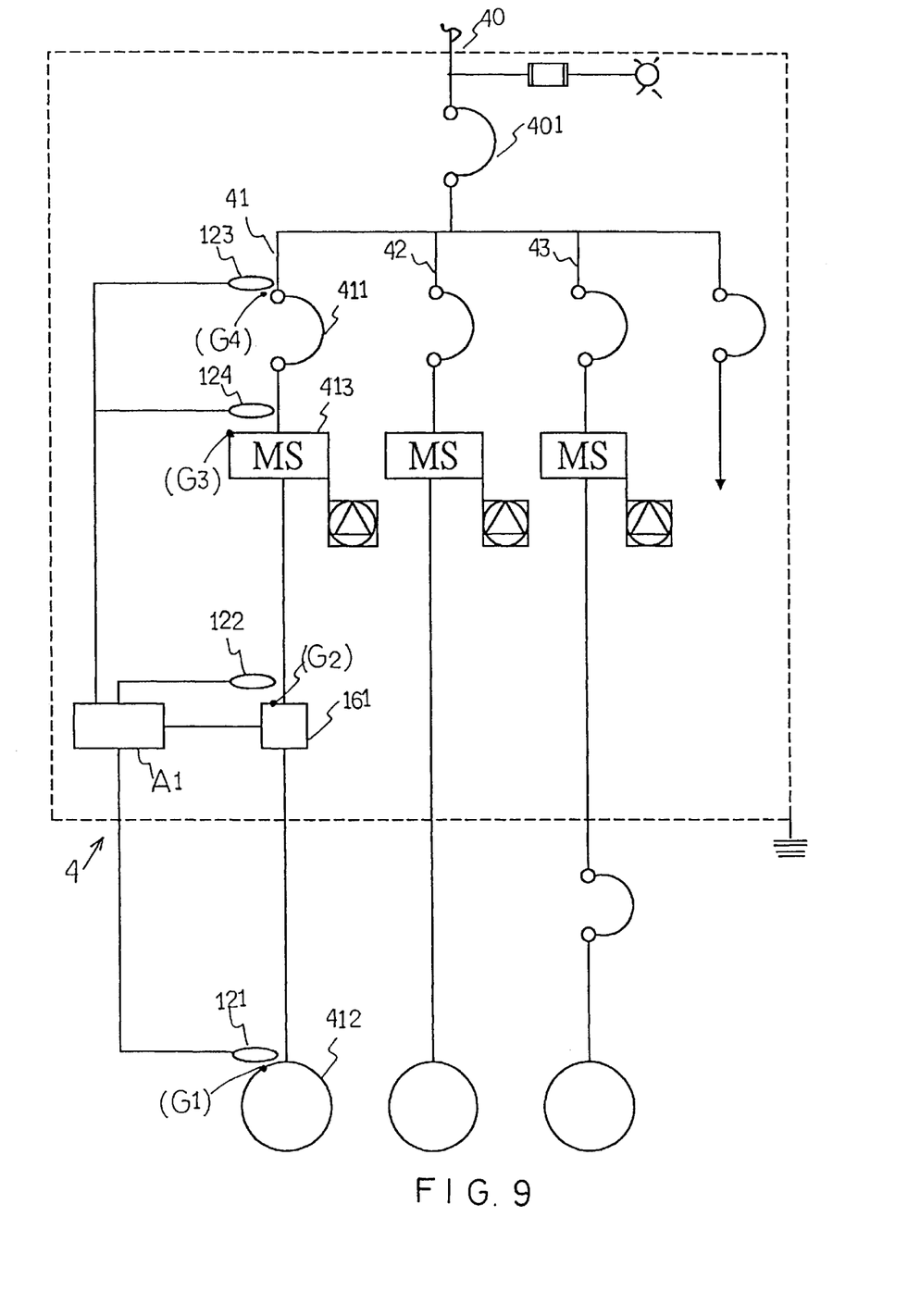
FIG. 9 is a circuit diagram of an electric equipment in accordance with another embodiment of the present invention.

As shown in FIG. 9, the sensing unit can be used for detecting a single circuit. The sensing unit is used to detect a single branch circuit 41 of the electric equipment 4. The branch circuit 41 includes a branch switch 411, an electromagnetic switch 413, and a load 412. The device A1 of the present invention includes sensing members 121, 122, 123, 124 each corresponding to the load 412, the control unit 161, the electromagnetic unit 413, and the branch switch 411 respectively each corresponding to a detected point G1, G2, G3, and G4 respectively. When one of the detected points G1, G2, G3, and G4 is overheated, the load 412 is unloaded by the control unit 161 for decreasing the temperature of the overheated members.

Figure 10:
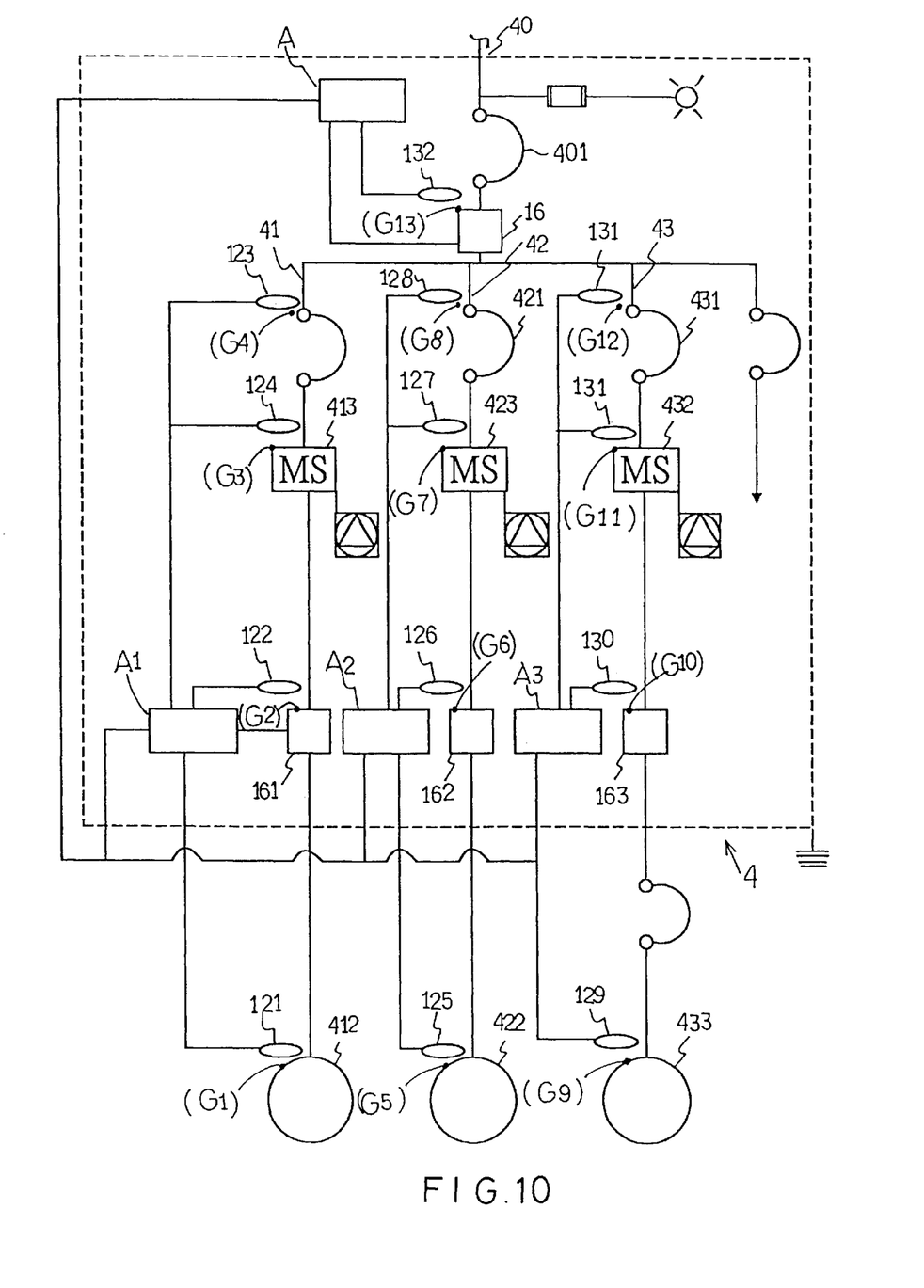
FIG. 10 is a circuit diagram of an electric equipment in accordance with another embodiment of the present invention.

As shown in FIG. 10, the sensing unit can be used for detecting the whole electric equipment 4. The device A1 of the present invention is mounted on the main circuit 40 and includes a sensing member 132 for detecting the detected point G13 of the control unit 16. The main circuit 40 includes branch circuits 41, 42, 43, each corresponding to the device A1, A2, A3, while each of the detecting members 121, 122 . . . 130, 131 corresponds to the detected members including the loads 412, 422, 433 . . . the electromagnetic switches 413, 423, 432 . . . the branch switches 411, 421, 431, 401, each of which has a detected point G2 . . . G12. When the detected point G of one of the circuits 41, 42 and 43 is overheated, one of the loads 412, 422 and 433 is unloaded by the respective device A1, A2 or A3. When one of the detected points G1 . . . G12 is overheated, the load 412, 422 or 433 is unloaded by the control unit 161, 162 or 163. When the detected point G13 of the entire circuit 4 is overheated, the entire circuit 4 is unloaded by the control unit 16.

Figure 3A:
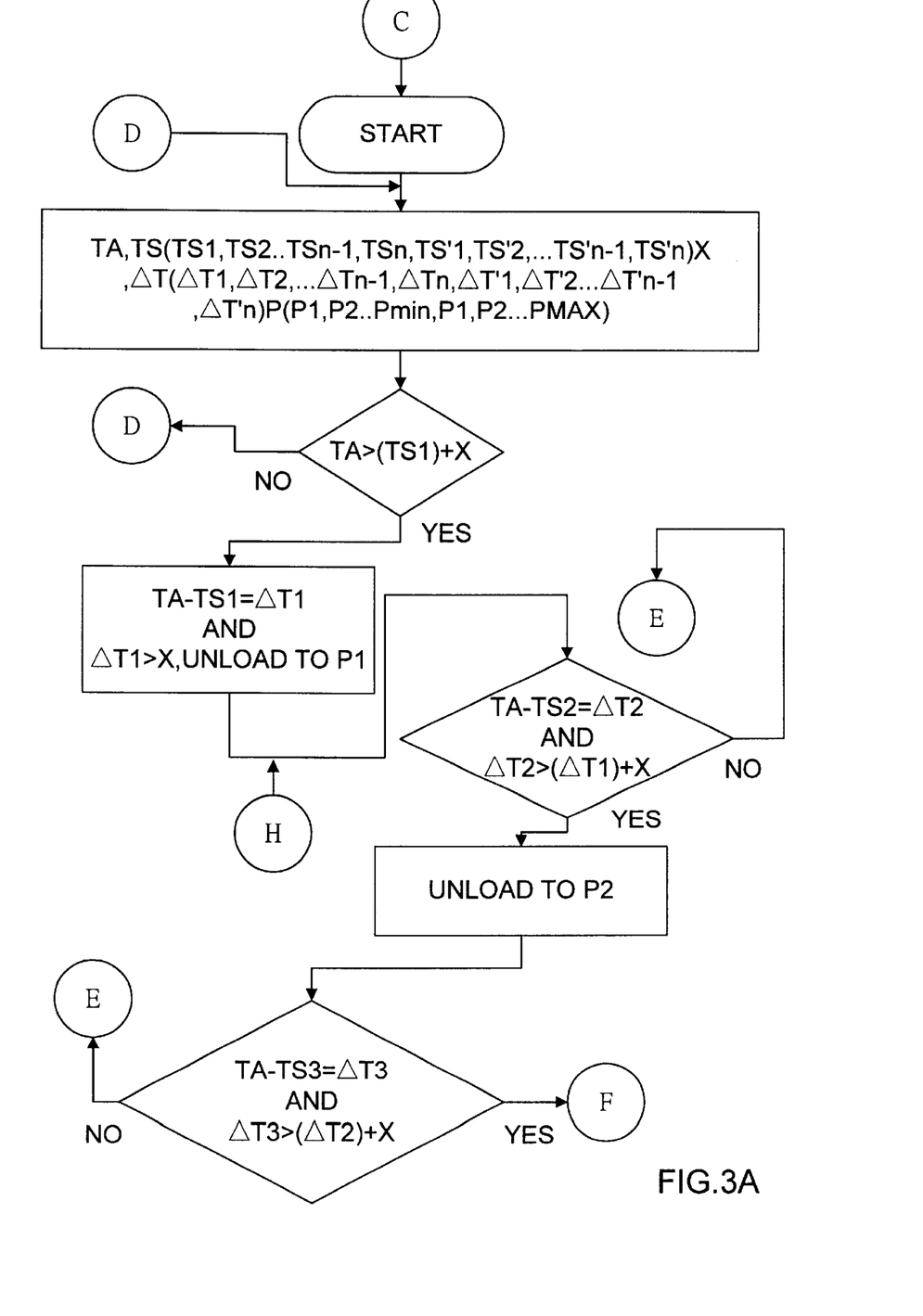
FIG. 3 is a flow chart of a control method in accordance with the present invention.
Figure 3B:
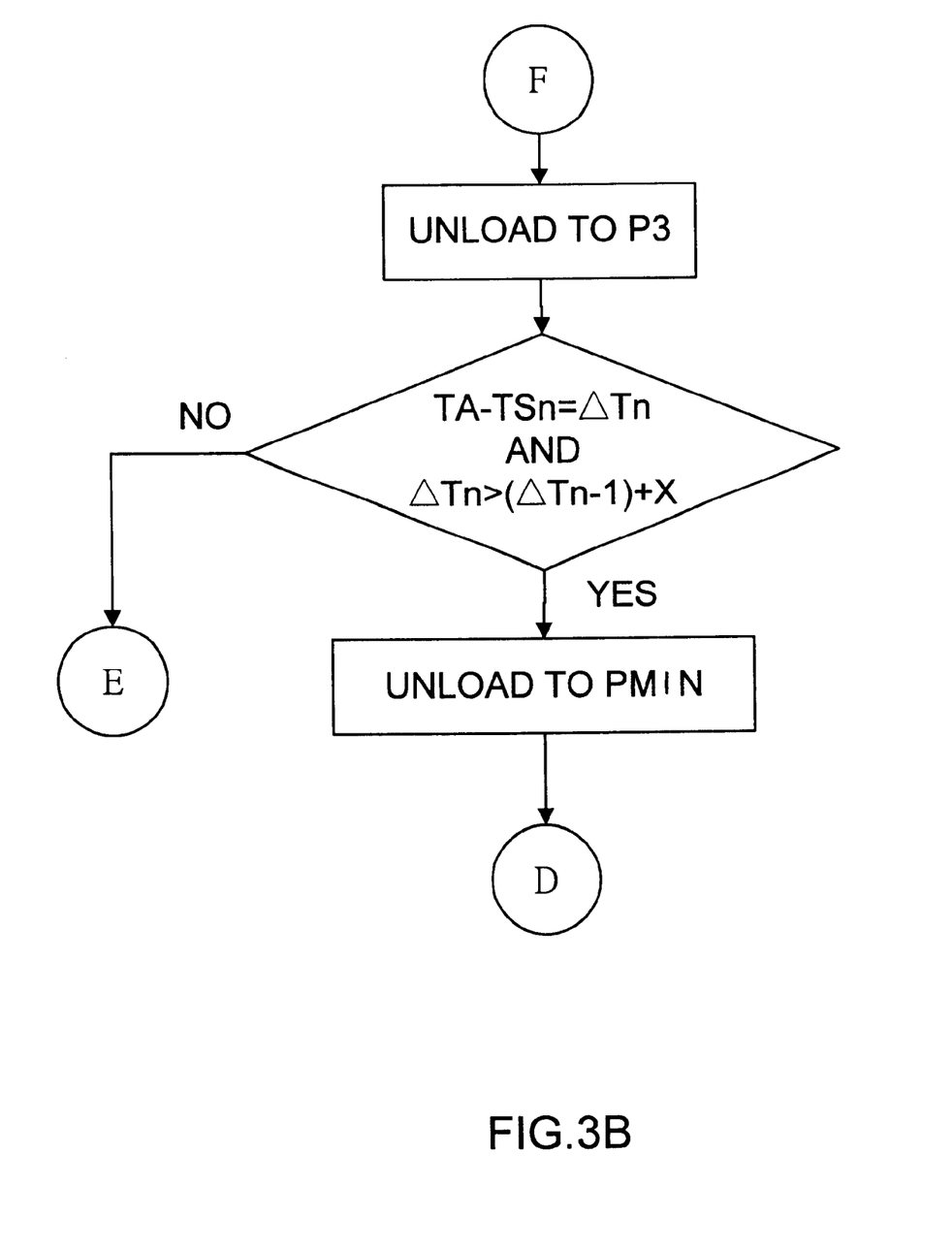
Figure 3C:
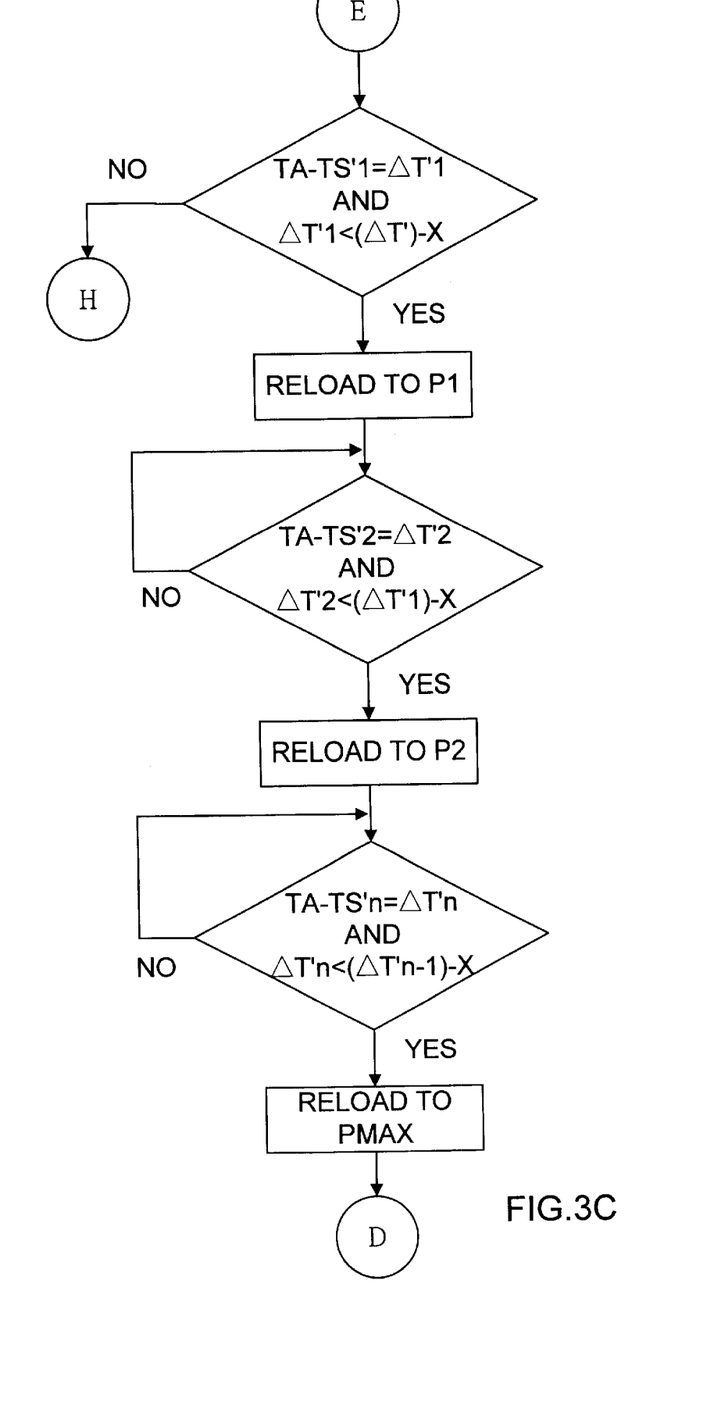

As shown in FIG. 3, the control method using power to prevent overheat inside of an electric equipment of the present invention comprises the following steps.

When a detecting value (TA) of one of the detected points G1, G2 . . . $G_N$ is greater than a first temperature setting value (TS1) plus a setting difference value (X), namely, TA>TS1+X, it indicates that the temperature of one of the detected points G1, G2 . . . $G_N$ is overheated so that the loads 412, 422, 433 . . . have to be unloaded to decrease the temperature of the detected members. Therefore, when TA−TS1=ΔT1, and ΔT1>X, the load 412, 422 or 433 is unloaded to a first grade of power (P1), wherein, ΔT1 is a first temperature setting difference value.

When the detecting value (TA) minus a second temperature setting value (TS2) is equal to a second temperature setting difference value (ΔT2), and the second temperature setting difference value (ΔT2) is greater than a first temperature setting difference value (ΔT1) plus the setting difference value (X), namely, TA−TS2=ΔT2, and ΔT2>ΔT1+X, then the load is continuously unloaded to a second grade of power (P2).

Then, when the detecting value (TA) sequentially minus each grade of temperature setting value (TS3 . . . $TS_n$) is equal to each grade of temperature setting difference value (ΔT3 . . . $ΔT_{n-1}, ΔT_n$), and each grade of the temperature setting difference value (ΔT3 . . . $ΔT_{n-1}, ΔT_n$) is greater than a former grade of temperature setting difference value (ΔT4 . . . $ΔT_{n-2}, ΔT_{n-1}$) plus the grade of setting difference value (X), namely, TA−$TS_n$=$ΔT_n$, and $ΔT_n$>$ΔT_{n-1}$+X, then the load is successively unloaded to a minimum power ($P_{min}$).

When the detecting value (TA) minus a first reload temperature setting value (TS'1) is equal to a first reload temperature setting difference value (ΔT'1), and the first reload temperature setting difference value (ΔT'1) is smaller than a temperature setting difference value (ΔT') minus the setting difference value (X), namely, TA−TS'1=ΔT'1, and ΔT'1<ΔT'−X, then the load is continuously reloaded to a first grade of power (P1).

Then, when the detecting value (TA) sequentially minus each grade of reload temperature setting value (TS'2 . . . $TS'_n$) is equal to each grade of reload temperature setting difference value (ΔT'2 . . . $ΔT'_{n-1}, ΔT'_n$), and each grade of the reload temperature setting difference value (ΔT'2 . . . $ΔT'_{n-1}, ΔT'_n$) is smaller than a former grade of reload temperature setting difference value (ΔT'1 . . . $ΔT'_{n-2}, ΔT'_{n-1}$) minus the grade of setting difference value (X), namely, TA−$TS'_n$=$ΔT'_n$ and $ΔT'_n$>$ΔT'_{n-1}$−X, then the load is successively reloaded to a maximum power ($P_{max}$).

Accordingly, when the temperature of one of the detected members (G) is greater than the predetermined value, the loads 412, 422, 433 . . . can be unloaded automatically, thereby preventing the detected members from being overheated. When the state of overheat is removed, the loads 412, 422, 433 . . . can be reloaded automatically so as to recover the load power.

Figure 5:
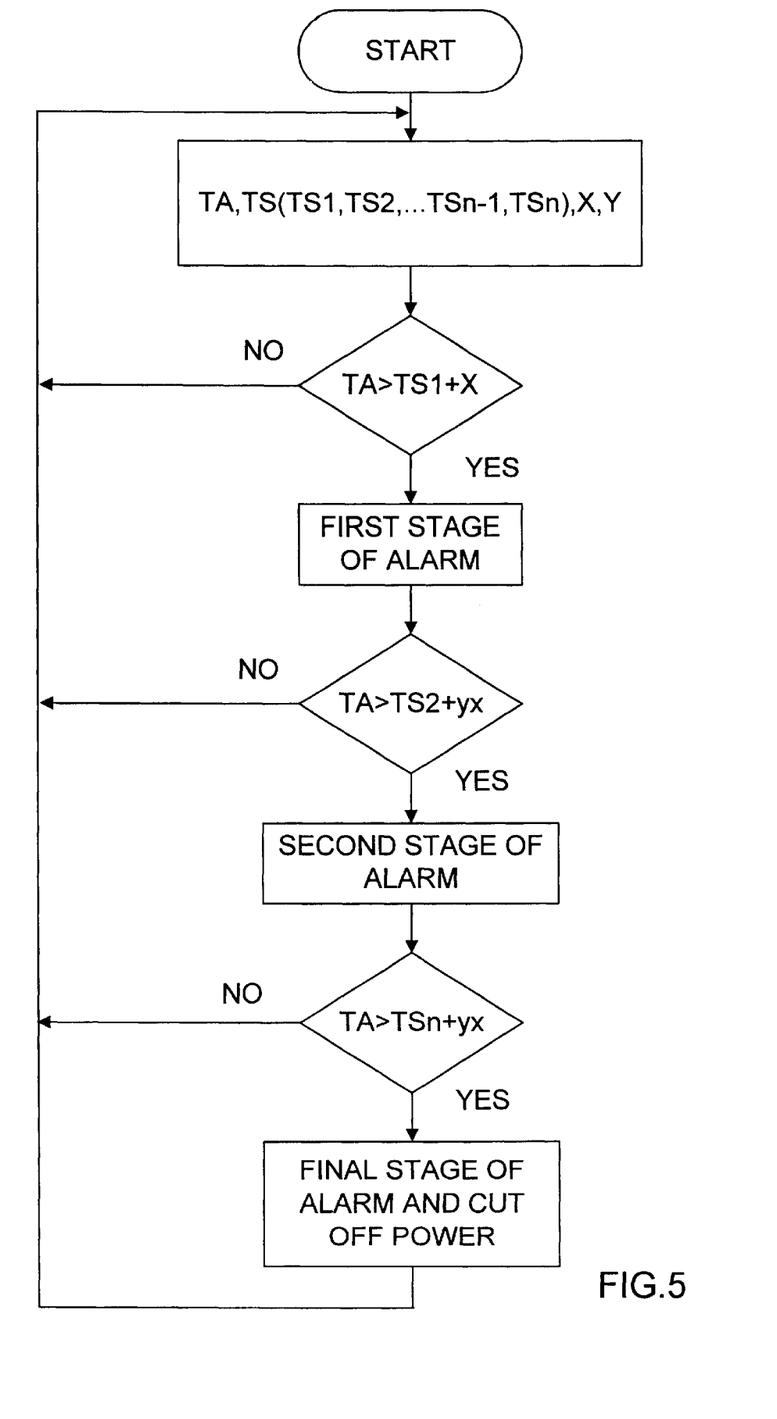
FIG. 5 is a flow chart of an alarm control method in accordance with the present invention.

As shown in FIGS. 2 and 5, a process for performing the action of the alarm unit 14 includes the following steps.

When the detecting value (TA) is greater than the first temperature setting value (TS1) plus the setting difference value (X), namely, TA>TS1+X, it indicates that the temperature of one of the detected members (G) is greater than the predetermined value, the alarm unit 14 sends a first stage of alarm signal.

When the detecting value (TA) is greater than the second temperature setting value (TS2) plus the setting difference value (X) multiplied by a setting coefficient (y), namely, TA>TS2+yX, the alarm unit 14 sends a second stage of alarm signal.

When the detecting value (TA) is sequentially greater than each grade of temperature setting value (TS3 . . . $TS_{n-1}, TS_n$) plus the setting difference value (X) multiplied by the setting coefficient (y), namely, TA>$TS_n$+yX, the alarm unit 14 sends each stage of alarm signal. When the alarm unit 14 sends the last stage of alarm signal, the power cut-off protection unit 15 forces to cut off the power for protecting the detected members.

On the other hand, the detected points G1, G2 . . . $G_N$ may not operate normally due to fading degrees.

Figure 6:
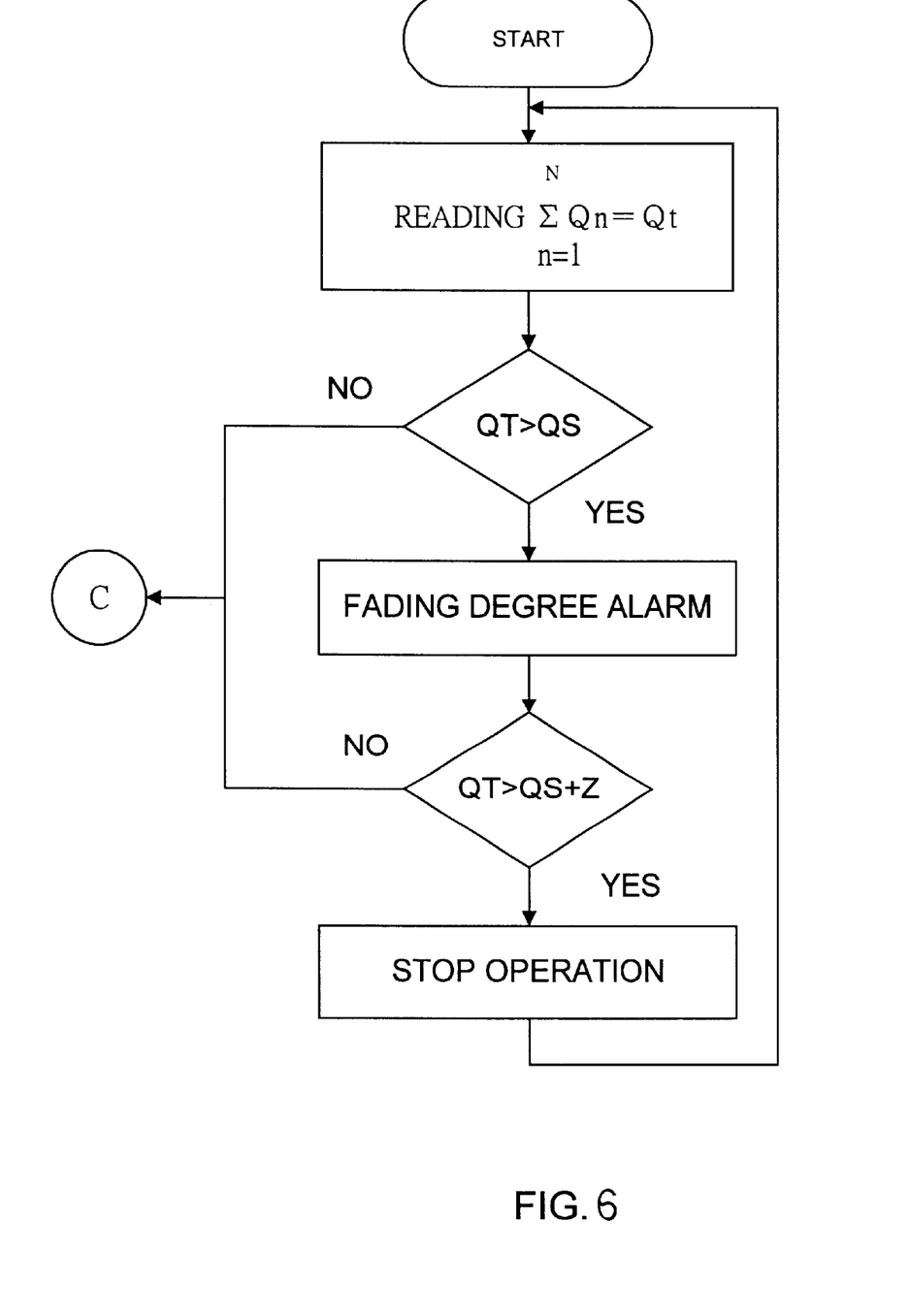
FIG. 6 is a flow chart of a fading alarm control method in accordance with the present invention.

As shown in FIG. 6, a pre-alarm control process for detecting the fading degree of each detected member includes the following steps.

(1) Reading the total value ($Q_t$) of each fading parameter of each detected member in the electric equipment, when the total value ($Q_t$) is greater than a setting fading value ($Q_s$), namely, $Q_t > Q_s$, the alarm unit 14 detects a fading alarm signal;

(2) When the total value ($Q_t$) is greater than the setting fading value ($Q_s$) plus a setting difference value (Z), namely, $Q_t > Q_s + Z$, it indicates that the fading degree is serious so that the central processing unit 13 outputs a control signal to the control unit 16, the alarm unit 14, and the power cut-off protection unit 15 so as to force the electric equipment to stop output of power, thereby stopping operation the electric equipment.

(3) When $Q_t \leq Q_s$ or $Q_t \leq Q_s + Z$, it indicates that the fading degree is endurable so that the electric equipment can be operated normally.

Figure 7:
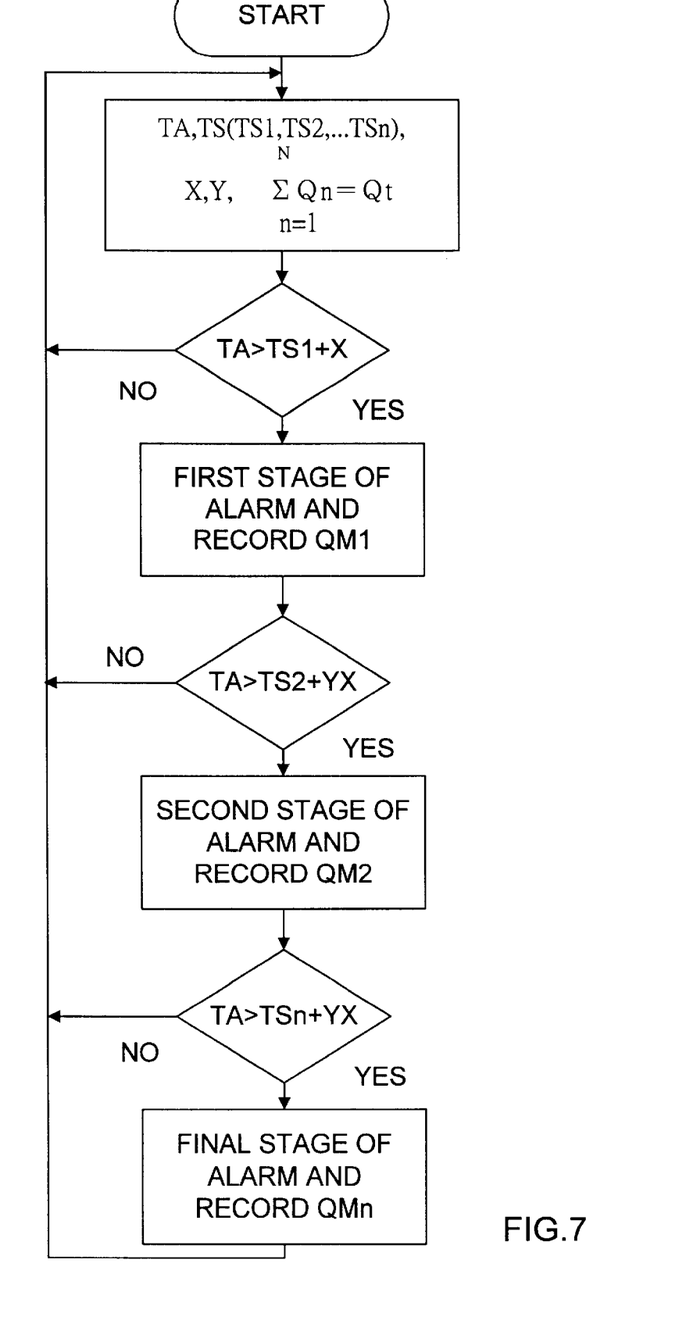
FIG. 7 is a flow chart of a fading alarm recording control method in accordance with the present invention.

As shown in FIG. 7, the central processing unit can be used to record each fading degree value $Q(Q_{m1} \ldots Q_{mn})$, and the operation process includes the following steps.

When TA>TS1+X, the alarm unit sends a first stage of alarm, and the value of $Q_{m1}$ is recorded, wherein $Q_{m1}$ is the fading value of the detected point when TA>TS1+X.

When TA>TS2+yX, the alarm unit sends a second stage of alarm, and the value of $Q_{m2}$ is recorded, wherein $Q_{m2}$ is the fading value of the detected point when TA>TS2+X.

When TA>TS3+yX, the alarm unit sends a third stage of alarm, and the value of $Q_{m3}$ is recorded, wherein $Q_{m3}$ is the fading value of the detected point when TA>TS3+X.

The above procedures are repeated successively.

When TA>$TS_{n-1}$+yX, the alarm unit sends a (N–1)$^{th}$ stage of alarm, and the value of $Q_{m(n-1)}$ is recorded.

Finally, when TA>$TS_n$+yX, the alarm unit 14 sends a final stage of alarm, and the power cut-off protection unit 15 is used to force the electric equipment to stop output of power, thereby stopping operation the electric equipment.

It should be clear to those skilled in the art that further embodiments may be made without departing from the scope of the present invention.

What is claimed is:

1. A control method using power to prevent overheat inside of an electric equipment comprising the steps of:

(1) when a detecting value (TA) is greater than a first temperature setting value (TS1) plus a setting difference value (X), namely, TA>TS1+X, the load is unloaded to a first grade of power (P1);

(2) when said detecting value (TA) minus a second temperature setting value (TS2) is equal to a second temperature setting difference value ($\Delta$T2), and said second temperature setting difference value ($\Delta$T2) is greater than a first temperature setting difference value ($\Delta$T1) plus said setting difference value (X), namely, TA–TS2=$\Delta$T2, and $\Delta$T2>$\Delta$T1+X, then the load is continuously unloaded to a second grade of power (P2), then, when said detecting value (TA) sequentially minus each grade of temperature setting value (TS3 ... $TS_n$) is equal to each grade of temperature setting difference value ($\Delta$T3 ... $\Delta T_{n-1}$, $\Delta T_n$), and each grade of said temperature setting difference value ($\Delta$T3 ... $\Delta T_{n-1}$, $\Delta T_n$) is greater than a former grade of temperature setting difference value ($\Delta$T4 ... $\Delta T_{n-2}$, $\Delta T_{n-1}$) plus said grade of setting difference value (X), namely, TA–$TS_n$=$\Delta T_n$, and $\Delta T_n$>$\Delta T_{n-1}$+X, then the load is successively unloaded to a minimum power ($P_{min}$);

(3) when said detecting value (TA) minus a first reload temperature setting value (TS'1) is equal to a first reload temperature setting difference value ($\Delta$T'1), and said first reload temperature setting difference value ($\Delta$T'1) is smaller than a temperature setting difference value ($\Delta$T') minus said setting difference value (X), namely, TA–TS'1=$\Delta$T'1, and $\Delta$T'1<$\Delta$T'–X, then the load is continuously reloaded to a first grade of power (P1), then, when said detecting value (TA) sequentially minus each grade of reload temperature setting value (TS'2 ... $TS'_n$) is equal to each grade of reload temperature setting difference value ($\Delta$T'2 ... $\Delta T'_{n-1}$, $\Delta T'_n$), and each grade of said reload temperature setting difference value ($\Delta$T'2 ... $\Delta T'_{n-1}$, $\Delta T'_n$) is smaller than a former grade of reload temperature setting difference value ($\Delta$T'1 ... $\Delta T'_{n-2}$, $\Delta T'_{n-1}$) minus said grade of setting difference value (X), namely, TA–$TS'_n$=$\Delta T'_n$, and $\Delta T'_n$>$\Delta T'_{n-1}$–X, then the load is successively reloaded to a maximum power ($P_{max}$).

2. The control method using power to prevent overheat inside of an electric equipment in accordance with claim 1, wherein a process for an alarm unit includes the steps of:

(1) when said detecting value (TA) is greater than said first temperature setting value (TS1) plus said setting difference value (X), namely, TA>TS1+X, said alarm unit sends a first stage of alarm signal;

(2) when said detecting value (TA) is greater than said second temperature setting value (TS2) plus said setting difference value (X) multiplied by a setting coefficient (y), namely, TA>TS2+yX, said alarm unit sends a second stage of alarm signal;

(3) when said detecting value (TA) is sequentially greater than each grade of temperature setting value (TS3 ... $TS_{n-1}$, $TS_n$) plus said setting difference value (X) multiplied by said setting coefficient (y), namely, TA>$TS_n$+yX, said alarm unit sends each stage of alarm signal.

3. The control method using power to prevent overheat inside of an electric equipment in accordance with claim 1, wherein a pre-alarm control process for detecting the fading degree of each detected member includes the steps:

(1) reading the total value ($Q_t$) of each fading parameter of each detected member in said electric equipment, when said total value ($Q_t$) is greater than a setting fading value ($Q_s$), namely, $Q_t > Q_s$, said alarm unit detects a fading alarm signal;

(2) when the total value ($Q_t$) is greater than said setting fading value ($Q_s$) plus a setting difference value (Z), namely, $Q_t > Q_s + Z$, a central processing unit outputs a control signal to a control unit, an alarm unit, and a power cut-off protection unit to force the electric equipment to stop output of power, thereby stopping operation the electric equipment.

* * * * *